July 27, 1926.
R. W. KEELER
STARTING MECHANISM FOR ROLLER TRACTORS
Filed July 8, 1924
1,593,874
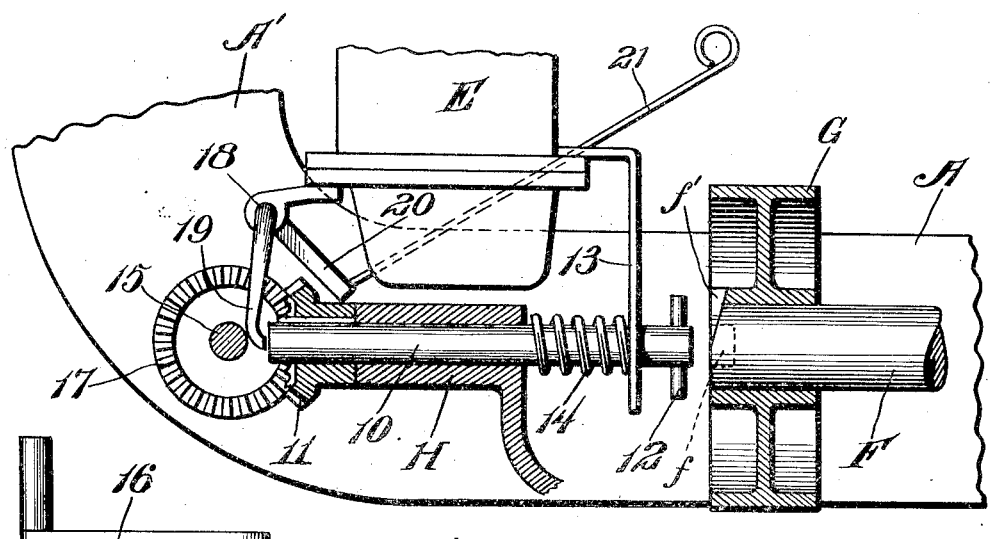
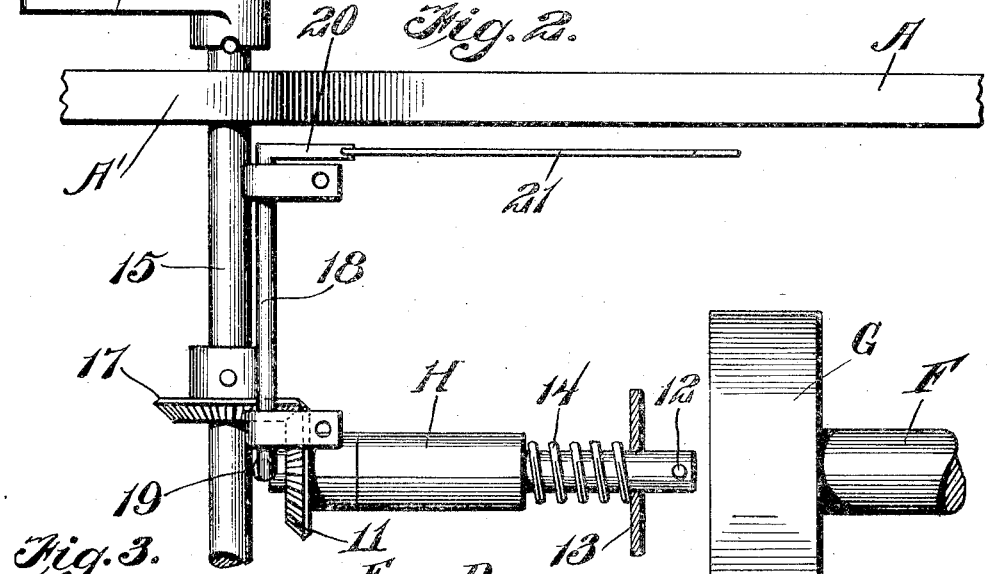
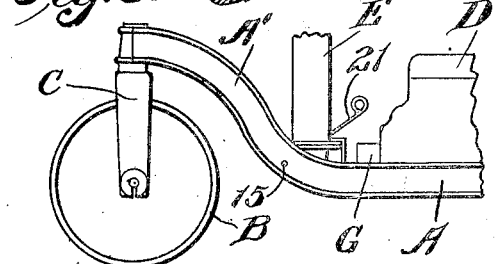
Inventor
Raymond W. Keeler
Frederick S. Stitt
Atty Patented July 27, 1926.

1,593,874

UNITED STATES PATENT OFFICE.

RAYMOND W. KEELER, OF GALION, OHIO, ASSIGNOR TO THE GALION IRON WORKS & MFG. CO., OF GALION, OHIO, A CORPORATION OF OHIO.

STARTING MECHANISM FOR ROLLER TRACTORS.

Application filed July 8, 1924. Serial No. 724,903.

This invention relates to tractors, and particularly to certain features of the general form of tractor illustrated and described in my pending application for patent on Fordson roller tractor Serial #724,907 filed on the 8th day of July 1924.

In the Fordson tractor, the motor is started by a starting crank projecting out from the forward end of the machine immediately beneath the radiator and through the cylinder front cover, and until the advent of the starting mechanism now in use and disclosed in this present application there were many accidents even with ordinary Ford motor cars due to the engine being started and the clutch either not having been thrown out or slipping so that the machine started up while a person was cranking and ran over the operator. Furthermore, it is common today to mount Fordson power plants on many different forms of tractors and also on different forms of road rollers. Such a roller with a Fordson tractor unit or power plant is particularly difficult and dangerous to crank when the power plant is mounted upon the frame of a tractor whose wheels are in advance of the power plant or upon the frame of a roller tractor, as in this case it is necessary that the operator shall stoop down or crawl beneath the forward end of the power plant supporting frame and reach behind the front rollers and there operate the crank, in which position he is obviously very likely to be badly injured in case the engine starts up, which it is liable to do, and may be also badly injured by the crank striking him when he is in a cramped position between the forward end of the frame and the front rollers. Many accidents have actually occurred from this source, and it is the main object of the present invention to do away with this cranking mechanism which necessitates cranking from in front of the power plant and provide in place thereof cranking mechanism which is operated from the side of the power plant.

Another object is to provide a starting mechanism of the character stated which is normally out of engagement with the driving shaft of the engine but which may be readily shifted into engagement therewith by the operator, which will permit the starting mechanism to be held in engagement with the driving shaft of the tractor by friction as the starting mechanism and shaft are rotated to start the engine but which will automatically cause the release of the engagement between the starting mechanism and the crank shaft when the crank shaft speeds up beyond the speed of the starting mechanism.

My invention is illustrated in the accompanying drawing, wherein:—

Figure 1 is a longitudinal sectional view through the starting mechanism showing one of the tractor beams in elevation;

Figure 2 is a fragmentary top plan view of the structure shown in Figure 1;

Figure 3 is a fragmentary elevation of the roller tractor showing the position of the parts.

Referring to this drawing, it will be seen that I have indicated so much of the tractor mechanism and framework as is necessary for an understanding of my invention but that I have not attempted to illustrate any of the details of such a tractor, reference being made to the other application above referred to for such details.

In the drawing, A designates the frame beam of the tractor which extends horizontally from the rear end of the tractor forward and then at a point about equivalent with the lower end of the radiator extends upward, as at A', and then forward to a point above the roller B which is mounted in the yoke C. The Fordson motor D is mounted upon the frame beams A in the manner described in my application before referred to, and the radiator of this Fordson motor is designated E. On a level below the radiator there is disposed the driving shaft F of the motor, carrying the fan pulley G. This driving shaft F at its forward end is formed with a central socket $f$ and with the radially extending beveled slot $f'$, as is usual.

It will be understood, of course, that the rear end of this frame A carries the usual rear rollers. It will be seen that with the construction just described it is necessary for the person starting the engine to crawl in between the front rollers and the forward end of the engine and there operate the starting crank. This is extremely difficult to do in this cramped position and very dangerous, and in order to avoid this inconvenience I provide means whereby the engine may be started from the side of the frame instead of in front of the engine. To this end, I mount within the usual bearing H commonly found on Fordson tractors the longitudinally extending starting shaft 10. This starting shaft at its forward end has splined upon it the beveled gear 11 and at its rear end the starting shaft carries the transversely extending pin 12 adapted to co-act with the radially extending groove $f'$ in the shaft F. Surrounding the starting shaft 10 and bearing against an abutment 13 is a spring 14. The shaft 10 slides through the beveled pinion 11 far enough to insert the pin 12 into the crank shaft of the tractor, and when the engine starts after power being applied to the spring 10, the spring acts to pull the shaft 10 back to the clearance illustrated in Figure 1 and out of its engagement with the shaft F.

Mounted upon the forward end of the motor and extending transverse to the longitudinal axis of the tractor is a shaft 15. A crank 16 is either permanently or detachably connected to the outer end of this shaft and pinned upon the shaft is a beveled gear wheel 17 which is adapted to engage with the beveled gear pinion 11 previously described. Thus it will be obvious that the pinion may be rotated and rotate the shaft 10. It is necessary, of course, to shift the shaft 10 rearward so as to bring the pin 12 into engagement with the ratchet notch $f'$, and to this end I mount in suitable bearings the transverse rock shaft 18. This rock shaft is supported in suitable bearings and carries at one end the depending finger 19, the lower end of which is rearwardly curved and approximates the extremity of the crank shaft 10. The opposite end of the rock shaft 18 carries upon it a radially extending arm 20 which is disposed to extend downward and rearward and is connected to a pull wire 21 terminating in a finger hold.

It will be obvious now that when this wire is pulled, the finger 19 will force the pin or shaft 10 into the socket in the crank shaft F and that the pin 12 will engage with the groove $f$, and that when this has been accomplished the rotation of the crank 16 will start the motor and that, just as in the ordinary Ford car or Fordson tractor, as soon as the motor starts the spring will pull the shaft back so as to clear the pin $a$ from its engagement with the notch or groove. It is obvious that many minor modifications might be made without departing from the spirit of the invention as defined in the appended claims.

It will be seen that with this construction a motor may be operated without the operator getting in front of the machine at all and, therefore, without any danger and without the operator having to get under the machine or operate in a cramped and relatively small space. Furthermore, this device permits Fordson engines to be used in connection with tractors and particularly in connection with tractor road rollers having parts, such as the wheels thereof, which are disposed to obstruct access to the crank shaft and disposed forward of the engine.

While I have illustrated this device as applied to such an implement as a road roller, I do not wish to be limited thereto, as while it is particularly adapted for these road rollers it is also adapted to different forms of tractors and other implements, such as road maintainers, scarifiers, graders and the like, wherein the tractor having the power plant is formed with or carries a road-engaging implement forward of and which would tend to prevent or obstruct easy manipulation of the ordinary starting crank.

I claim:—

1. In an implement having an engine designed to be started from the end, the implement having a member obstructing access to the end of the engine from which it is started, means on the side of the implement whereby the engine may be started.

2. An implement having an engine and a longitudinally extending power shaft whereby the engine is normally started from the end of the engine, the implement having a member obstructing access to the power shaft, a starting mechanism normally out of operative engagement with the power shaft but having an operating member on the side of the implement and manually operable at the side of the implement, whereby the starting mechanism may be temporarily engaged with the power shaft.

3. An implement having an internal combustion engine designed to be started from the front of the engine, the implement having a roller disposed immediately in front of the engine and obstructing access to the front end thereof, and means on the side of the implement rearward of said roller whereby the engine may be started.

4. In an implement having an engine, a frame upon which the engine is supported, front and rear wheels supporting the frame, the engine being normally started from the front end, and means on the side of the implement rearward of the front wheels whereby the engine may be started.

5. An implement having an internal combustion engine and a longitudinally extending power shaft whereby the engine is normally started from the forward end of the engine, the implement including a roller mounted in advance of the engine, said roller obstructing access to the forward end of the power shaft, starting mechanism on the side of the implement rearward of said roller and normally out of operative engagement with the power shaft, and manually operable means whereby the starting mechanism may be temporarily engaged with the power shaft.

6. In an implement having an internal combustion engine, a longitudinally extending power shaft whereby the engine is normally started from the front end thereof, the implement having a roller disposed immediately in front of the power shaft and obstructing access thereto, a starting crank mounted upon the side of the engine rearward of said roller, and manually operable means for temporarily connecting the starting crank with the power shaft.

7. The combination with a tractor including a frame and a front wheel, an internal combustion engine supported on the frame and disposed rearward of the front wheel, the engine including a longitudinally extending power shaft, a portion of the tractor being disposed immediately in front of said power plant and obstructing access thereto, a starting mechanism for the engine including a crank extending transversely of the tractor and having its handle disposed exteriorly to the frame of the tractor rearward of said front wheel.

8. The combination with a tractor having a front wheel, an internal combustion engine on the tractor disposed rearward of the front wheel, said engine including a longitudinally extending power shaft, a portion of the tractor being disposed immediately in front of said power plant and obstructing access thereto, of starting mechanism for the engine including a crank extending transversely of the tractor and having its handle disposed exteriorly to the frame of the tractor and rearward of said front wheel.

9. The combination with a tractor having a front roller, a supporting frame, an internal combustion engine mounted upon the frame rearward of said front roller and including a longitudinally extending power shaft adapted to be started from the forward end of the engine, said forward roller obstructing access to said power shaft, of starting mechanism for the engine including a transversely extending crank shaft mounted upon the frame of the engine and having a crank disposed exteriorly of the engine and rearward of the front roller, a longitudinally extending shaft disposed in alignment with the power shaft and operatively engaged at all times with the transversely extending crank shaft, manually operable means for shifting said second named shaft rearward and into engagement with the power shaft of the engine, and a spring normally urging the second named shaft out of engagement with the power shaft of the engine.

10. The combination with a tractor roller having a supporting frame comprising two longitudinally extending beams, the beams at their forward ends extending upwardly and convergently, a yoke supporting the forward ends of the beams, an axle extending through the yoke, a roller mounted upon the axle, an internal combustion engine mounted upon said frame and including a longitudinally extending drive shaft, of means for starting the engine comprising a shaft disposed in alignment with the power shaft and operatively supported below the radiator of the engine, said shaft being longitudinally shiftable and having means at its rear end whereby it may be operatively connected to the drive shaft when shifted rearward, a spring urging said shaft forward out of engagement with the drive shaft, a beveled gear wheel splined on said starting shaft, a transverse shaft mounted below the engine and extending laterally outward through the frame, a crank mounted on this shaft exteriorly of the frame, a beveled gear wheel mounted on the shaft and meshing with the first named beveled gear wheel, a shaft supported above the last named shaft and extending parallel thereto and having means at one end and exteriorly of the tractor frame whereby it may be oscillated, and a finger at the other end of the shaft bearing against the starting shaft and adapted when the finger is pressed inward to engage the starting shaft with the power shaft of the engine.

In testimony whereof I affix my signature.

RAYMOND W. KEELER.